United States Patent [19]
Knudson et al.

[11] Patent Number: 5,231,748
[45] Date of Patent: Aug. 3, 1993

[54] FASTENING APPARATUS

[75] Inventors: Gary A. Knudson, 17356 W. 57th Ave., Golden, Colo. 80401; Robert J. Bendt, Broomfield, Colo.

[73] Assignee: Gary A. Knudson, Golden, Colo.

[21] Appl. No.: 807,228

[22] Filed: Dec. 16, 1991

[51] Int. Cl.$^5$ .................. B21D 37/00; B23P 19/00
[52] U.S. Cl. .................. 29/243.517; 29/512; 227/15; 227/55
[58] Field of Search ............ 29/243.517, 243.518, 29/243.5, 244, 505, 509, 525.1, 512; 227/52, 55, 56, 15

[56] References Cited

U.S. PATENT DOCUMENTS

| | | | |
|---|---|---|---|
| Re. 27,978 | 4/1974 | Gulistan | 29/243.517 |
| 1,176,793 | 3/1916 | Tuttle . | |
| 2,087,969 | 7/1937 | Gookin | 29/243.517 |
| 3,261,073 | 7/1966 | Klenk . | |
| 3,890,695 | 6/1975 | Gaastra | 29/243.517 |
| 4,306,511 | 12/1981 | Ashby et al. . | |
| 4,328,612 | 5/1982 | Leistra, Jr. et al. | 29/243.517 |
| 4,611,381 | 9/1986 | LaBarge et al. . | |
| 4,688,316 | 8/1987 | LaBarge et al. . | |
| 4,765,177 | 8/1988 | Pendleton et al. | 227/15 |
| 4,829,804 | 5/1989 | Strobel | 227/55 |
| 4,843,204 | 6/1989 | Ueno . | |

FOREIGN PATENT DOCUMENTS 2822051  11/1979  Fed. Rep. of Germany .................. 29/243.517

*Primary Examiner*—David Jones
*Attorney, Agent, or Firm*—Fields, Lewis, Pittenger & Rost

[57] ABSTRACT

Fastening apparatus and method for forming a rivet-type fastener are disclosed for joining two pieces together that is particularly suitable for use in constructing a building. The fastening apparatus utilizes an actuating rod preferably driven by a hydraulic cylinder with the rod being inserted through a fastening section and holes in pieces to be fastened. A set of dies has one fixed and one pulled by the rod through the holes to form at least one rolled flange or two rolled flanges to form a hollow fastener that secures the pieces together. The rod is automatically returned to an extended position to be ready for the next operation. The fastener has a relatively large inside diameter in relation to the thicknesses of the pieces being fastened to avoid shear of the piece and prevent having the flange deform under load.

16 Claims, 3 Drawing Sheets

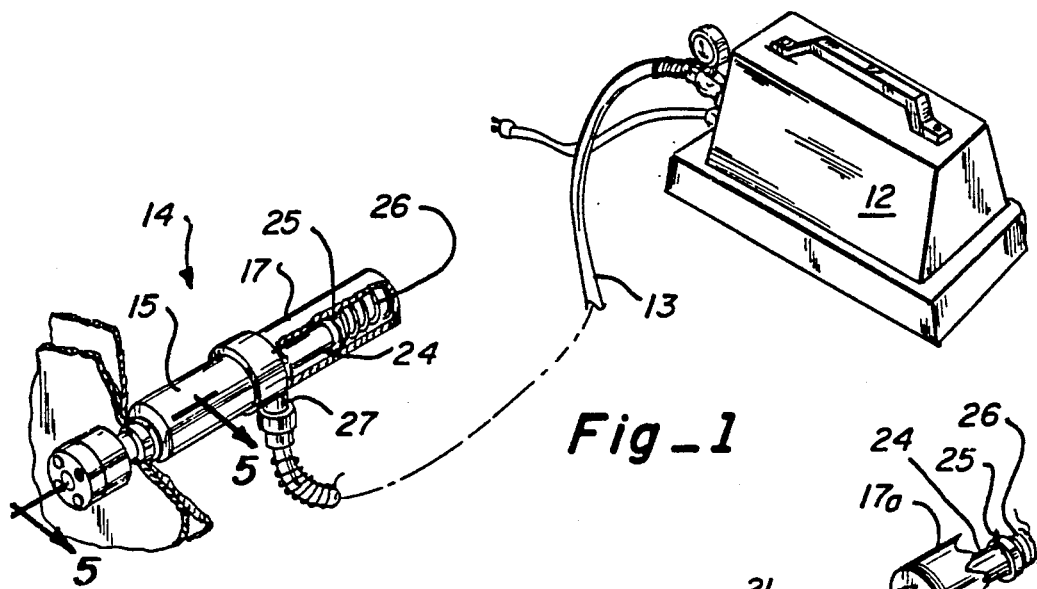
Fig_1
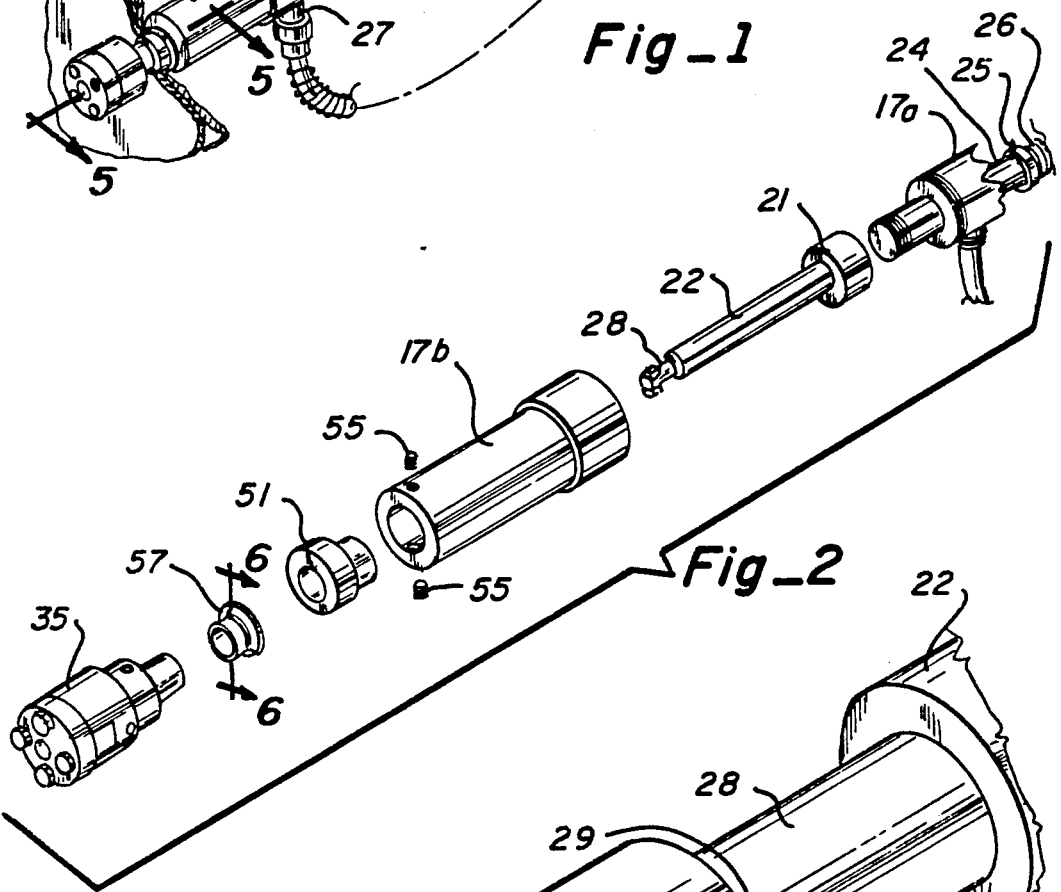
Fig_2
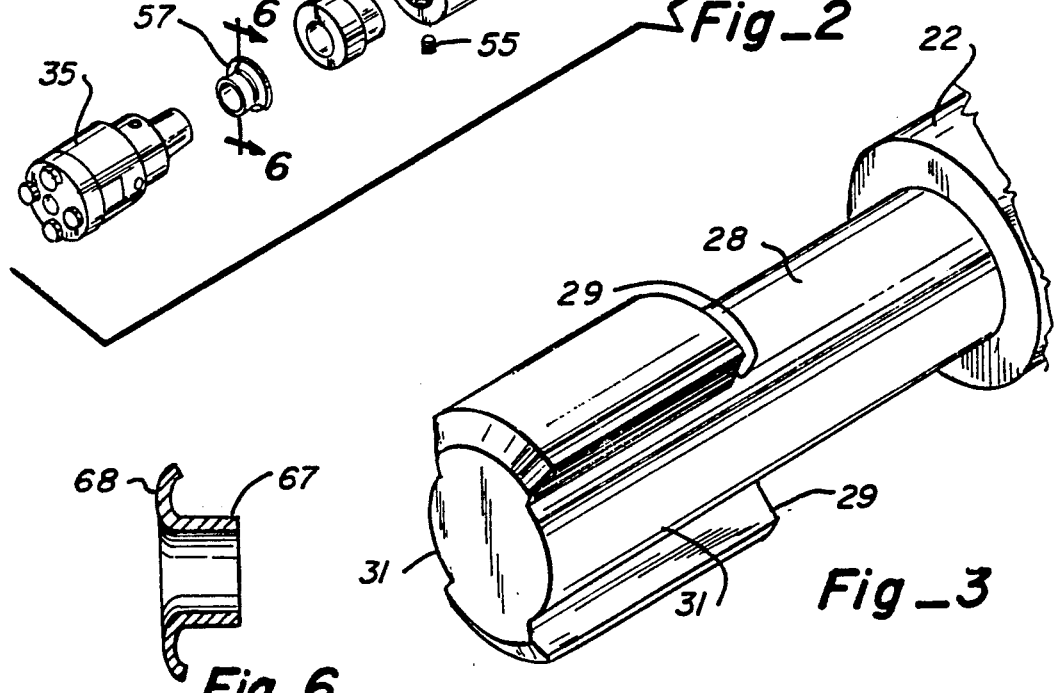
Fig_3
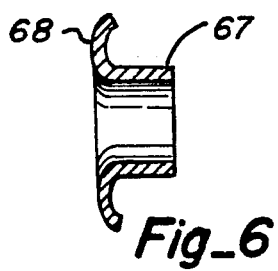
Fig_6

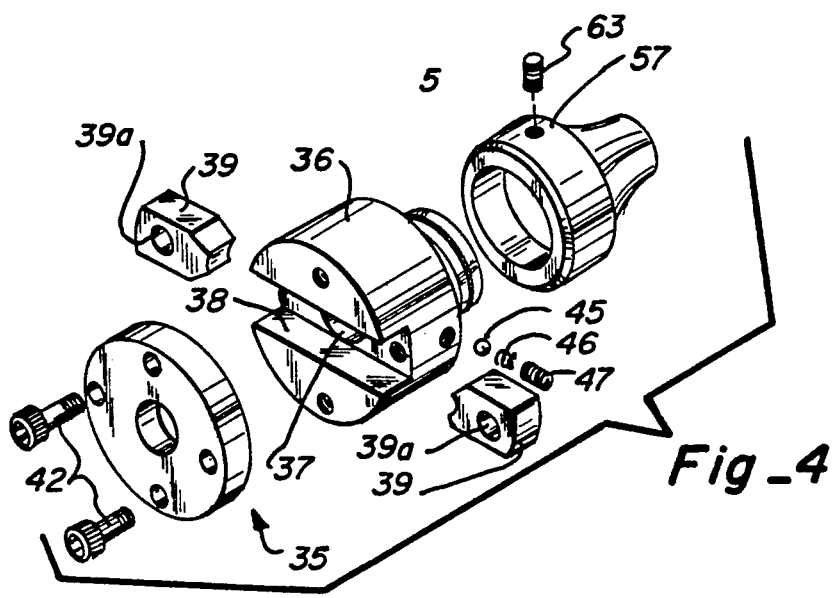
Fig_4
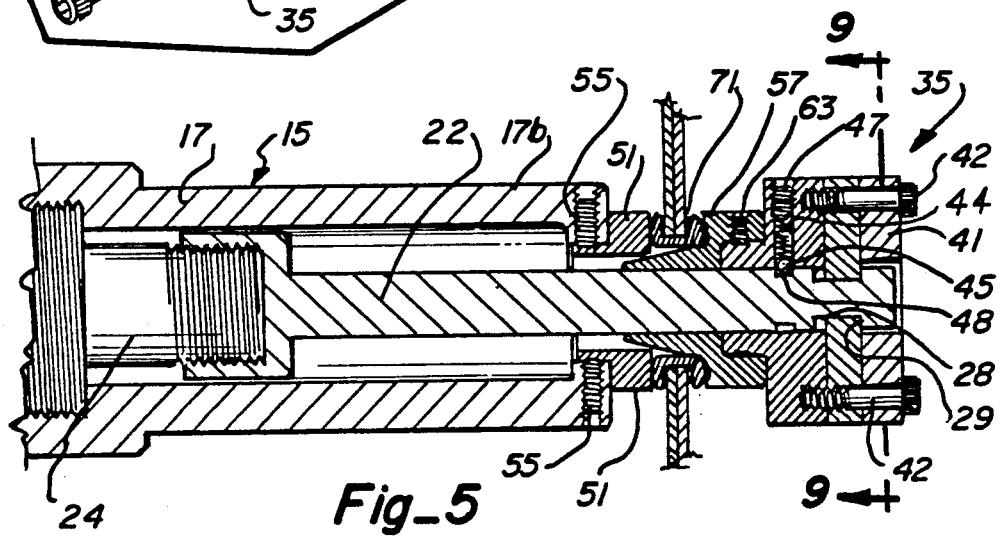
Fig_5
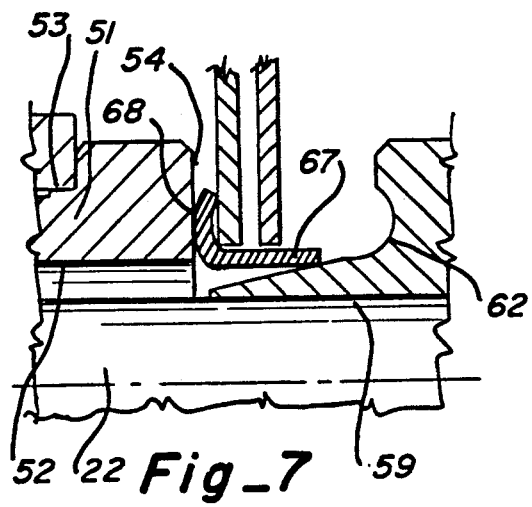
Fig_7
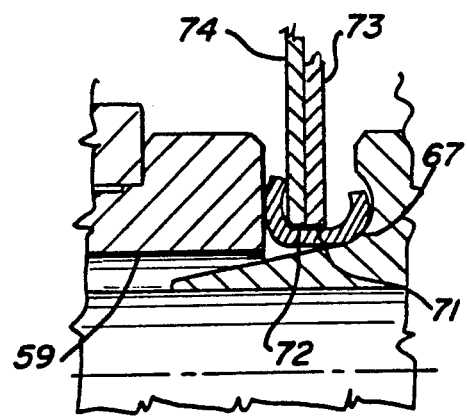
Fig_8

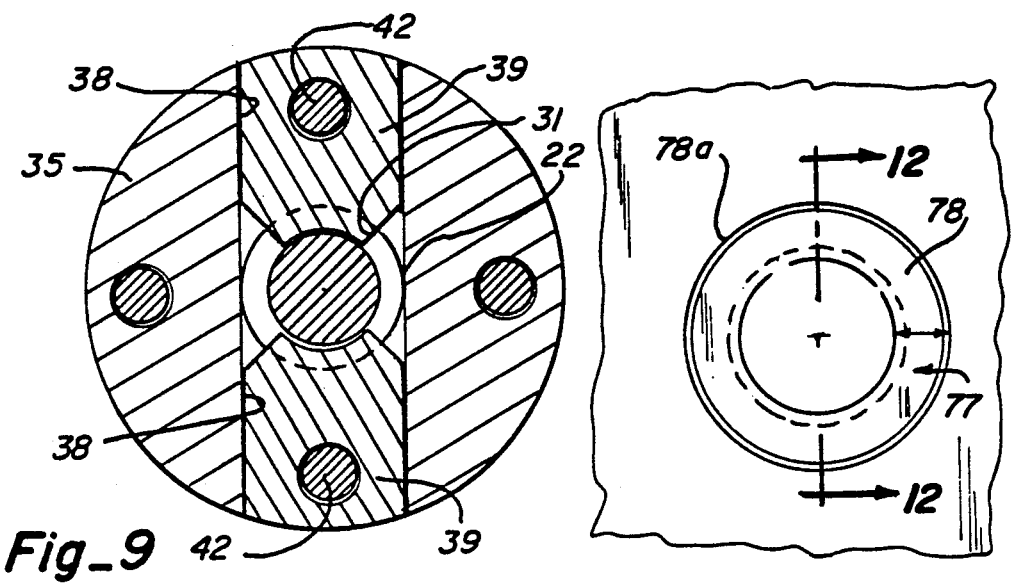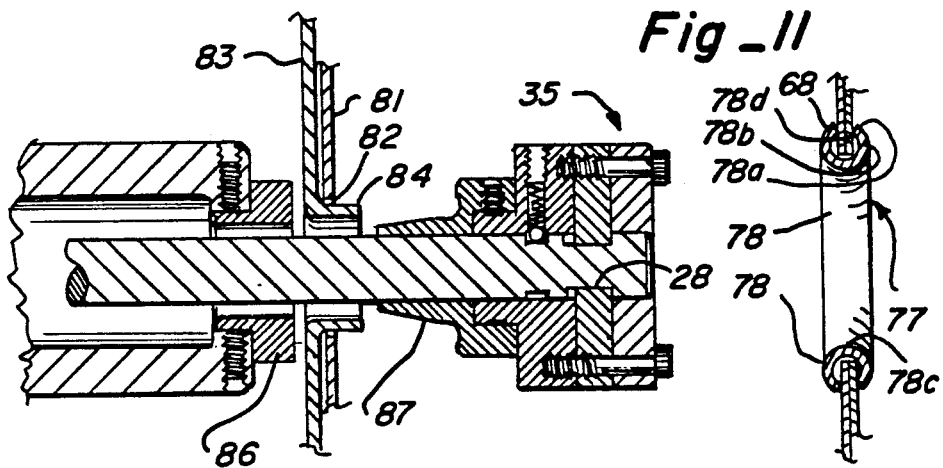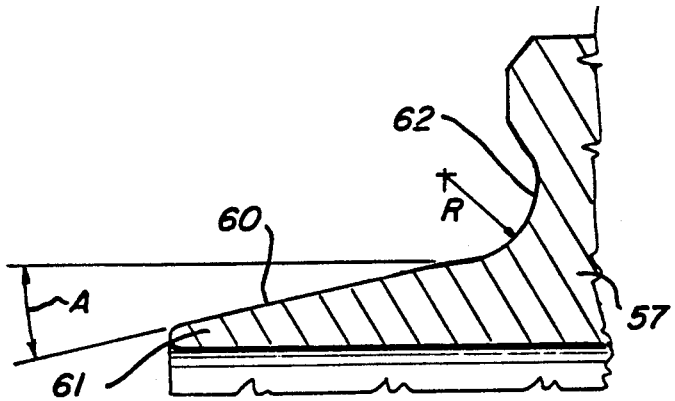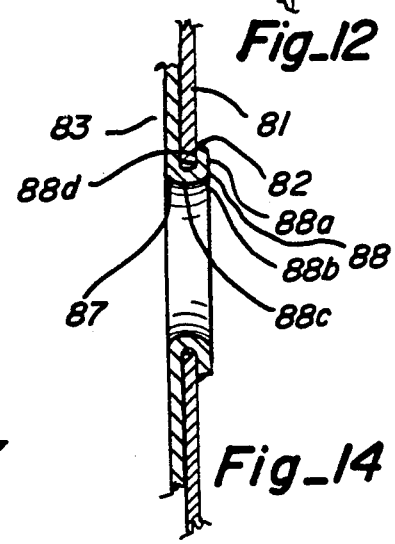

FASTENING APPARATUS

TECHNICAL FIELD

The present invention relates to a novel and improved fastening apparatus and method and rivet-type fastener for joining together at least two pieces.

BACKGROUND ART

The fastening together of pieces such as two pieces of sheet metal used in a building has heretofore been accomplished primarily by the drilling of holes and use of the conventional bolt and nut fasteners. In a building the pieces may be, for example, wall panels, roof panels, frame panels or gussets connected at joints to frame panels between roof and side walls and also to roof trusses. A building using the rivet-type fasteners disclosed herein is described in a copending application entitled STRAIGHT WALL BUILDING AND METHOD AND APPARATUS FOR CONSTRUCTING.

Tuttle U.S. Pat. No. 1,176,793 and Klenk U.S. Pat. No. 3,261,073 disclose a clinching punch hand tool which has a die that perforates layers of sheet metal and clinches the layers together to form a rivet-type fastener.

Ashby U.S. Pat. No. 4,306,511 discloses a power-driven pierce and extrusion punch and pierce curl die that pierces a hole through two pieces and curls the punched portions back to effect a fastening (FIG. 1A).

La Barge U.S. Pat. Nos. 4,611,381 and 4,688,316 teach making hollow rivets in two pieces of malleable material using a punch die and forming interlocking flanges from the punched out portions of the two sheets.

Ueno U.S. Pat. No. 4,843,204 discloses an open-ended protruding piece in a first plate inserted into a hole in a second plate with a flange formed in the protruding edge to form a rivet-type fastener.

DISCLOSURE OF THE INVENTION

The fastening apparatus and method disclosed includes a reciprocally movable actuating rod preferably driven by a hydraulic cylinder that is normally extended and has a free end portion that is inserted through aligned holes in at least two pieces to be fastened together. The pieces in a sheet metal building are the skin and frame panels, gussets and roof truss panels. A hollow fastening section is disposed in and extends beyond the holes. The actuating rod extends through a first die and carries a second die so that as the second die is drawn back through the holes the dies cause a radial enlargement of at least one end of the fastening section to form an end flange larger than the holes to form a hollow rivet-type fastener that fastens the two pieces together. In one embodiment disclosed the fastening section has one end formed as a part of one of the pieces being fastened and in another embodiment the fastening section is separate from the pieces being fastened and preferably has a flange at one end with the other end sized to insert into the holes in the pieces and a second flange is formed in the inserted end by the fastening apparatus after insertion into the holes.

The rivet-type fastener so formed has a relatively large inside diameter in comparison to the thickness of the pieces being fastened to afford substantial surface area contact by the flange against the piece the flange contacts and the thickness of the fastener is at least substantially equal to the thickness of the thickest of the two pieces being fastened to avoid shear of the pieces and prevent having the flange deform under load.

BRIEF DESCRIPTION OF THE DRAWINGS

Details of this invention are described in connection with the accompanying drawings in which like parts bear similar reference numerals and in which:

FIG. 1 is a perspective view of fastening apparatus embodying features of the present invention.

FIG. 2 is an exploded view of portions of the fastening apparatus shown in FIG. 1.

FIG. 3 is an enlarged perspective view of the free end portion of the actuating rod.

FIG. 4 is an exploded view of the detachable die holder.

FIG. 5 is a sectional view taken along line 5—5 of FIG. 1 with the movable die in an almost fully retracted position.

FIG. 6 is a sectional view taken along line 6—6 of FIG. 2 showing a hollow fastening section with a flange at one end.

FIG. 7 is a sectional view showing a partially retracted movable die in relation to the fastening section and sheets being fastened.

FIG. 8 is a sectional view showing the movable die moved to a further retracted position.

FIG. 9 is a sectional view taken along line 9—9 of FIG. 5.

FIG. 10 is an enlarged sectional view of the movable die.

FIG. 11 is a front elevational view of the completed rivet-type fastener drawn to full scale.

FIG. 12 is a sectional view taken along line 12—12 of FIG. 11.

FIG. 13 is a sectional view of another form of fastening section and fastening apparatus used to fasten the pieces together with the shown movable die in an extended position.

FIG. 14 is a sectional view showing the fastened pieces accomplished by the fastening apparatus of FIG. 13.

DETAILED DESCRIPTION

Referring now to FIG. 1 there is shown a portable hydraulic pressure source 12 that connects into an electric socket with source 12 having a fluid line 13 for supplying a fluid under pressure. The fastening apparatus 14 shown includes a two-way hydraulic cylinder 15 having a two-piece outer housing 17 with a rear housing portion 17a with external threads on the front end that threads into internal threads in the rear end of a front housing portion 17b. A piston 21 reciprocally moves in the housing 17 and moves an actuating rod 22 having a portion in the housing and a portion that extends through and projects beyond the forward end of the housing 17.

A rod extension 24 with an enlarged head 25 is secured at the rear end of the piston 21. In particular, the forward end of the rod extension 24 has external threads that thread into internal threads in the piston 21 as seen in FIG. 5. A return spring 26 bears against the inside of the rear end of the housing and head 25 and returns the rod 22 to the extended position when the fluid pressure at the inlet is removed. A fluid inlet portion 27 in the housing is coupled to fluid line 13. Apparatus found suitable for cylinder 15 is a Model RCP-55 sold by the ENERPAC Corporation, Butler, Wis.

An outer free end portion of the piston rod 22 has a neck 28 inset a selected distance from its terminal end to provide a set of opposed inwardly facing, radially extending arcuate retaining surfaces 29 that span arcs of about 80 degrees. The rod has a pair of oppositely disposed axially and circumferentially extending channel-like grooves 31 each spanning an arc of about 100 degrees.

A removable or detachable die holder 35 removably or detachably mounts on the end of the rod 22. Holder 35 has a cylindrical main body 36 with a central axial throughbore 37 and a radial slot 38 which slidably receives a pair of oppositely disposed radially extending keepers 39. When the holder 35 is on the rod 22 in a fastened position the keepers extend radially into the neck 28 and bear against the retaining surfaces 29 to hold the die holder 35 against axial movement on the rod for one angular position for the die holder. The grooves 31 are slightly wider than the width of the ends of the keepers 39 which permit the holder to be rotated 90 degrees about its longitudinal axis so that when the opposed keepers 39 are in alignment with the opposed grooves 31 and the holder 35 can be axially slid off the end of the rod for removal. Similarly, the keepers are aligned with the grooves to enable the die holder to slide on the rod after the rod is inserted through the holes in the pieces. A retaining plate 41 is secured to the front end of the main body 36 by four bolts 42. These bolts extend through holes in the plate, into holes 39a in the keepers and thread into the main body 36 to hold the keepers in place. The main body is provided with an internally threaded radial bore 44 which receives a ball 45, spring 46 and set screw 47 to releasably lock the main body to the rod 22. The rod 22 is provided with an annular groove 48 into which the ball 45 is forced by the set screw 47.

A first die 51 has a cylindrical body with a central axial throughbore 52 having an internal diameter sized to receive a male portion of a second die 57 described hereinafter. Further the internal diameter of the throughbore 52 is greater than the external diameter of the rod 22 to slidably receive the rod 22. A step in the main body provides a rear end portion 53 of reduced diameter that will insert into an opening in the front housing portion 17b. The first die 51 has a flat radially extending end surface 54. A pair of opposed set screws 55 extend through holes in the housing and the first die 51 to releasably secure the first die to the housing 17.

The second die 57 has a cylindrical main body portion with a central axial throughbore 59 and has a tapered inner male section 61 of less diameter than the main body portion that increases in diameter from an inner end toward an outer end to provide a tapered surface 60 at a selected angle A with the horizontal axis shown as about 12 degrees and further has an arcuate section 62 formed along a selected radius designated R which is an extension of the male section 61. Typically radius R is about $\frac{1}{8}$ inch. A set screw 63 extends through holes in body 58 and main body 36 to secure the swaging die to the rear end of die holder 35.

In use, a hollow fastening section 67 is provided. The fastening section has an end flange 68. This fastening section 67 may be made by using a short length of metal pipe and a set of dies similar to dies 51 and 57 above described and forming the flange 68 by having the two dies brought together under pressure. The fastening section 67 is inserted into aligned holes 71 and 72 in pieces to be fastened shown as portions of two sheets 73 and 74, respectively, to be joined. The sheets shown are of the same thickness but it is understood that in many instances the sheets will have different thicknesses. Further these sheets in a building are frame panels, gussets and trusses as described fully in the above mentioned copending application.

The actuating rod without the die holder 35 and second die 57 is inserted into the fastening section and holes in the sheets and the free end of the fastening section 67 projects beyond the holes. The die holder 35 is attached to the free end portion of rod 22 and set screw 47 tightened as above described. The cylinder assembly 15 is actuated to cause the rod 22 to retract causing the second die 57 to move against the fastening section to compress the ends of the fastening section 67 between the two dies to form a rivet-type fastener 77 with a flange 78 that fastens the two sheets together. Once the fastener 77 is formed the pressure to the cylinder is released, the return spring 26 automatically moves the rod 22 to a return extended position.

As seen in FIGS. 7 and 8 in the flange forming process to make fastener 77, the tapered male section 61 is received in the throughbore 59 of the first die 51. The fastening section 67 rides first against the tapered surface 60 of the male section 61 and then the surface of the arcuate section 62 so as to roll or curl the hollow fastening section radially out and form a hollow, smooth, curved, or cold rolled flange 78 having a substantial flange gripping surface area 78c that bears against the exterior rounded surface of the adjacent piece 73. At the same time, the other curled flange 68 is further flattened against the other sheet 74. The flange 78 gradually decreases in thickness in a radial direction toward an outer peripheral edge 78a. The flange has outside surface 78b that extends along the exterior surface of the adjacent piece being fastened and a convexly curved inside edge 78c defining the hole through the fastener extending along the same radius of curvature as surface 76b.

The rivet-type fastener 77 so formed has a relatively large inside diameter in comparison to the thickness of the sheets being joined. An example for the sheets is sheet metal in the range of 0.03 to 0.06 inches with the hole in the fastener being 1 inch and the outside diameter about 1.05 inches so that the thickness of the fasteners is about 0.05 inches. The radial dimension of the flange is about 0.25 inches. A suitable range is 0.20 to 0.50 inches. The ratio of the diameter of the hole in the fastening section to the thickness of the pieces then is about 4 to 1 to 15 to 1 and preferably on the order of 8 to 1.

A typical fastener will have an internal dimension of at least four times the combined thickness of the pieces being fastened and a thickness of at least substantially equal to the thickness of the thickest of the two pieces. This provides a substantial flange gripping surface area so as to avoid shear of the pieces and prevent the flange from deforming under load.

Referring now to FIGS. 13 and 14 there are shown two pieces which are of a first sheet 81 with a hole 82 and a second sheet 83 with a fastening section 84 that is an extension of sheet 83 forms a hole 85 with fastening section 84 extending through and projecting beyond hole 82. In practice the fastening section 84 is made by using a male punch die to punch through the sheet 83 leaving a tubular fastening section 84 integral with the sheet and the free end is used to form the fastening flange. The fastener flange 88 has a peripheral edge 88a, curved outside surface 88b and convexly curved inside edge 88c defining the hole through the fastened pieces. The first die 86 on the housing 17 and the second die 87 on the die holder 35 is moved by the rod 22 in the same manner as above described to form a rivet-type fastener 87 with a flange 88 to fasten the sheets together.

Although the present invention has been described with a certain degree of particularity, it is understood that the present disclosure has been made by way of example and that changes in details of structure may be made without departing from the spirit thereof.

What is claimed is:

1. Fastening apparatus comprising:
   actuating means including an actuating rod having a free end portion inserted through a hollow fastening section and holes in two adjacent pieces,
   a first die disposed beyond one end of said fastening section, and
   a second die detachably mounted to the free end portion of said rod beyond the other end of said fastening section after insertion whereby when the rod is moved from a first position to a second position, said second die is moved against said other end of said fastening section and said one end against said first die which is held in a fixed position to form an end flange in said fastening section larger in size than said holes to form a hollow rivet-type fastener that fastens said piece together, said rod being automatically returned to said first position after the formation of said fastener,
   said free end portion having a selected nonuniform cross section with a first angular section of a larger diameter and a second angular section of a smaller diameter, said holder having a hole shaped to correspond with the cross section of said free end portion and sized in relation to the size of the end portion to enable said holder to align with and be slid on said free end portion in a first angular position and rotated to a second angular position so that opposed surfaces of said first angular section of said free end portion and said holder hold said holder against axial movement relative to said rod in said second angular position and be rotated to said first angular position to release said holder to slide from said rod.

2. Fastening apparatus as set forth in claim 1 wherein said fastener has an internal diameter of at least four times the combined thickness of said pieces being fastened and a thickness at least substantially equal to the thickness of the thickest of said pieces being fastened to provide a substantial flange gripping surface area against the exterior surface of the adjacent of said pieces to avoid shear of said pieces and prevent said flange from deforming under load.

3. Fastening apparatus as set forth in claim 1 wherein said end flange is rolled and has a curved outside surface.

4. Fastening apparatus as set forth in claim 1 wherein said fastening section is separate from said pieces.

5. Fastening apparatus as set forth in claim 1 wherein said fastening section is an integral part of one of said pieces and inserts into the hole in the other of said pieces when said pieces are placed side by side.

6. Fastening apparatus as set forth in claim 1 including motive power means for moving said rod including a fluid-pressure driven two-way cylinder having a housing and a piston in said housing secured to said rod with said piston being reciprocally movable in said housing.

7. Fastening apparatus as set forth in claim 6 wherein said cylinder is hydraulic and has a fluid inlet to receive fluid pressure to retract said rod into said housing and a compression spring in said housing that is arranged to return said rod to said first position when fluid pressure ceases at said inlet.

8. Fastening apparatus as set forth in claim 1 wherein said first die is removably mounted in an opening in the front end of a housing for said actuating rod and said rod extends through a throughbore in said first die.

9. Fastening apparatus as set forth in claim 8 wherein said first die has a generally cylindrical body with said throughbore sized to telescopically receive a male portion of said second die and a radially extending end surface against which the one end of the fastening section is moved when said rod is retracted.

10. Fastening apparatus as set forth in claim 1 wherein said second die has a generally cylindrical main body portion with a central axial throughbore, a tapered inner male section of less diameter than said main body portion that increases in diameter from an inner end toward an outer end with a tapered surface along a selected angle and an arcuate section formed along a selected radius extending axially and radially outwardly from said tapered male section whereby the inside of said fastening section is first moved along said tapered inner male section and radially outwardly into said arcuate section to form a curled flange.

11. Fastening apparatus as set forth in claim 10 wherein said arcuate section along which the end of said fastening section forms a flange with a generally smooth, generally semi-circular exterior surface that extends along and butts against an outer surface of an associated of said pieces.

12. Fastening apparatus comprising:
   actuating means including an actuating rod having a free end portion inserted through a hollow fastening section and holes in two adjacent pieces,
   a first die disposed beyond one end of said fastening section, and
   a second die detachably mounted to the free end portion of said rod beyond the other end of said fastening section after insertion whereby when the rod is moved from a first position to a second position, said second die is moved against said other end of said fastening section and said one end against said first die which is held in a fixed position to form an end flange in said fastening section larger in size than said holes to form a hollow rivet-type fastener that fastens said piece together, said rod being automatically returned to said first position after the formation of said fastener, said free end portion having a neck inset from a terminal end to provide a set of opposed, inwardly facing, radially extending arcuate retaining surfaces and a die holder detachably fastened to said rod on which said second die is mounted, a pair of opposed keepers carried by said die holder and extending radially inwardly past said retaining surfaces to hold said die holder against axial movement on said rod in a first angular position for said die holder with respect to said rod, said rod having a pair of oppositely disposed axially and circumferentially extending channel-like grooves which permit said die holder and keepers to be rotated about the longitudinal axis of said rod through a selected angle and released from said rod in a second angular position for said die holder by axially passing the ends of said keepers through said grooves.

13. Fastening apparatus as set forth in claim 12 wherein each said arcuate retaining surfaces extend through an arc of about 80 degrees and each said groove extends through an arc of about 100 degrees.

14. Fastening apparatus as set forth in claim 12 wherein said die holder has a generally cylindrical main body with a pair of opposed radial slots receiving and holding said keepers and a retaining plate mounted at the forward end of said main body for covering said slots with bolts extending through said plate, keepers and threading into said main body for retaining said keepers in place and attached to said main body.

15. Rivet-type fastening apparatus comprising:
    actuating means including an actuating rod in an extended position having a free end portion inserted through a hollow fastening section and holes in two adjacent pieces,
    a first die disposed at one end of said fastening section, and
    a second die detachably mounted to the free end portion of said rod at the other end of said fastening section after insertion whereby when the rod is moved from an extended position to a retracted position, said second die is moved against said other end of said fastening section and said one end against said first die to form an end flange by the radial enlargement of at least said other end that is larger in size than said holes to form a fastener that fastens said pieces together, said rod being automatically returned to said extended position after the formation of said flange,
    said free end portion having a selected nonuniform cross section with a first angular section of a larger diameter and a second angular section of a smaller diameter, said holder having a hole shaped to correspond with the cross section of said free end portion and sized in relation to the size of the end portion to enable said holder to align with and be slid on said free end portion in a first angular position and rotated to a second angular position so that opposed surfaces of said first angular section of said free end portion and said holder hold said holder against axial movement relative to said rod in said second angular position and be rotated to said first angular position to release said holder to slide from said rod, and
    motive power means for moving said rod including a fluid-pressure driven two-way cylinder having a housing and a piston in said housing secured to said rod with said piston being reciprocally movable in said housing.

16. Rivet-type fastening apparatus comprising:
    a hydraulic two-way cylinder including a housing, a piston movable in said housing, an actuating rod connected to said piston and having a free end portion extending through a front end portion of said housing and movable from an extended position to a retracted position, a fluid inlet through which a pressurized fluid is admitted to retract said rod into said housing and a return spring to return said rod to an extended position when said pressure is removed,
    a first die mounted in a forward end of said housing and having a throughbore through which said rod extends,
    a second die in a die holder detachably mounted at the free end portion of said rod,
    said free end portion having a selected nonuniform cross section with a first angular section of a larger diameter and a second angular section of a smaller diameter, said holder having a hole shaped to correspond with the cross section of said free end portion and sized in relation to the size of the end portion to enable said holder to align with and be slid on said free end portion in a first angular position and rotated to a second angular position so that opposed surfaces of said first angular section of said free end portion and said holder hold said holder against axial movement relative to said rod in said second angular position and be rotated to said first angular position to release said holder to slide from said rod,
    whereby upon the insertion of the free end portion of said rod through holes in two pieces to be fastened and a hollow fastening section and the actuation of said cylinder said rod is retracted to compress said fastening section between said dies to enlarge at least one end of said fastening section to a size larger than said holes to fasten said pieces together.

* * * * *